(12) United States Patent
Yagoda et al.

(10) Patent No.: US 8,244,798 B2
(45) Date of Patent: Aug. 14, 2012

(54) TECHNIQUES FOR SHARING CONTENT BETWEEN PORTALS

(75) Inventors: Yaron Yagoda, Tel Aviv (IL); Lior Bar-On, Ramat Gan (IL); Oren D. Root, Kfar Ben-Nun (IL); Amir Glatt, Tel Aviv (IL); Roy Abitbol, Kfar Neter (IL)

(73) Assignee: SAP Portals Israel Ltd., Ra'Anana (IL)

( * ) Notice: Subject to any disclaimer, the term of this patent is extended or adjusted under 35 U.S.C. 154(b) by 746 days.

(21) Appl. No.: 11/781,426

(22) Filed: Jul. 23, 2007

(65) Prior Publication Data

US 2009/0031004 A1   Jan. 29, 2009

(51) Int. Cl.
- G06F 15/16 (2006.01)
- G06F 15/167 (2006.01)
- G06F 15/173 (2006.01)
- G06F 17/00 (2006.01)
- G06F 3/00 (2006.01)
- H04L 9/32 (2006.01)

(52) U.S. Cl. ........ 709/203; 709/205; 709/212; 709/217; 709/219; 709/223; 709/227; 709/228; 709/245; 713/176; 715/234; 715/277; 715/733; 715/738; 715/744

(58) Field of Classification Search ............. None
See application file for complete search history.

(56) References Cited

U.S. PATENT DOCUMENTS

| | | | |
|---|---|---|---|
| 5,588,928 A * | 12/1996 | Koivunen | 475/126 |
| 7,035,907 B1 * | 4/2006 | Decasper et al. | 709/212 |
| 7,062,511 B1 * | 6/2006 | Poulsen | 1/1 |
| 7,103,844 B2 | 9/2006 | Jones et al. | |
| 7,383,320 B1 * | 6/2008 | Silberstein et al. | 709/219 |
| 7,437,427 B1 * | 10/2008 | Veeraraghavan et al. | 709/217 |
| 7,685,229 B1 * | 3/2010 | George et al. | 709/203 |
| 7,810,036 B2 * | 10/2010 | Bales et al. | 715/742 |
| 2001/0002472 A1 * | 5/2001 | Kanai et al. | 709/217 |
| 2002/0169852 A1 | 11/2002 | Schaeck | |
| 2003/0052912 A1 * | 3/2003 | Bowman et al. | 345/738 |
| 2003/0065638 A1 * | 4/2003 | Robert | 707/1 |
| 2003/0131070 A1 * | 7/2003 | Stroebel et al. | 709/217 |
| 2004/0015546 A1 | 1/2004 | Cotte | |
| 2004/0098451 A1 * | 5/2004 | Mayo | 709/203 |
| 2004/0181598 A1 * | 9/2004 | Paya et al. | 709/227 |
| 2004/0199497 A1 * | 10/2004 | Timmons | 707/3 |
| 2005/0097190 A1 * | 5/2005 | Abdelhak | 709/217 |
| 2005/0108406 A1 * | 5/2005 | Lee et al. | 709/228 |
| 2005/0114122 A1 * | 5/2005 | Uhrbach et al. | 704/220 |
| 2005/0259682 A1 * | 11/2005 | Yosef et al. | 370/468 |
| 2006/0136843 A1 * | 6/2006 | Shafron | 715/826 |
| 2007/0143620 A1 * | 6/2007 | Kanai et al. | 713/176 |

(Continued)

*Primary Examiner* — Ario Etienne
*Assistant Examiner* — Ho Shiu
(74) *Attorney, Agent, or Firm* — Buckley, Maschoff & Talwalkar LLC

(57) ABSTRACT

Techniques for sharing content between portals. A producer portal may identify content to be shared with one or more consumer portals. One or more of the shared content objects may then be copied to a consumer portal as remote delta link objects. Changes or modifications to the source object at the producer portal are automatically reflected in the corresponding target remote delta link object on the consumer portal. Any modifications or customizations made to the remote delta link object at the consumer portal override those of the producer's source object. In this manner, changes made to the second object are reflected in the first object while preserving the changes/modifications made to the first object on the first portal.

10 Claims, 5 Drawing Sheets

U.S. PATENT DOCUMENTS

2007/0203956 A1* 8/2007 Anderson et al. ............. 707/203
2007/0208751 A1* 9/2007 Cowan et al. ................... 707/10
2007/0239726 A1* 10/2007 Weiss et al. ..................... 707/10
2007/0240039 A1* 10/2007 Hosotsubo ................... 715/517
2007/0299985 A1* 12/2007 Craig et al. ................... 709/245
2008/0052668 A1* 2/2008 Craig et al. ................... 717/111
2008/0172372 A1* 7/2008 Shacham et al. .................. 707/5
2008/0172373 A1* 7/2008 Jenson et al. ..................... 707/5

* cited by examiner

TECHNIQUES FOR SHARING CONTENT BETWEEN PORTALS

BACKGROUND OF THE INVENTION

The present invention relates to portals, and more particularly to techniques for sharing content between portals.

A portal provides a gateway through which users can access various information sources, services, and applications. A portal may provide access to several portal components including one or more portal pages, portal snippets, etc. A portal page may comprise one or more portal snippets that enable data to be retrieved and displayed on the portal page. Portal snippets are generally programs that retrieve data from an information resource and display it on a portal page. Examples of portal snippets include portlets, SAP's™ iViews, Plumtree's™ gadgets, Microsoft's™ web parts, etc. Portals generally allow a user to select and customize portal snippets that are included in the user's portal page or pages. In this manner, the user can customize the content that is retrieved and displayed on the user's portal page.

Due to their popularity and convenience, the number of portals in organizations has seen a rapid increase. An organization may have several portals within their organizational network such as corporate portals, Enterprise Resource Planning (ERP) portals, and other portals based upon the organization's needs. For example, each business unit within an organization may maintain its business content on a separate portal. These portals may use portal servers from different vendors such as SAP and non-SAP vendors such as Oracle, IBM, etc.

In an environment comprising multiple portals, it is desirable that the portals be able to share content with one another. This has given rise to a Federated Portal Network (FPN) that creates a single network out of separate portal installations and enables content sharing between the portals. FPN allows an organization with multiple portals, including portals from different vendors, to share content between the independent portals. In such an FPN, it is desirable that a user of one portal be able to access information, services, and applications distributed on other portals throughout the network that are remote from the portal used by the user.

Various solutions have been proposed to enable sharing of content between portals. However, conventional solutions are plagued with several shortcomings and disadvantages. For example, one solution allows remote content from a remote portal to be copied to a local portal used by an end user. However, once the content has been copied, it is disconnected from the remote portal source and as a result any changes to the content at the remote portal are not reflected on the local portal. The administrator on the local portal has to recopy content from the remote portal in order to be synchronized. Other solutions do not allow customization of content on the local portal. Many of these solutions also impose a burden on the maintenance of the FPN. For example, updates to a particular portal in an FPN necessitate upgrades to all the other portals in the FPN. This is inefficient and reduces the availability of portals. The Web Service for Remote Portlets (WSRP) is a standard defined by OASIS technical committees and allows portlets from different vendors to be shared. WSRP is however quite limited in its functionality.

In light of the above, improved techniques are desired for sharing content between portals.

BRIEF SUMMARY OF THE INVENTION

Embodiments of the present invention provide techniques for sharing content between portals. A producer portal may identify content to be shared with one or more consumer portals. One or more of the shared content objects may then be copied to a consumer portal as remote delta link objects. Changes or modifications to the source object at the producer portal are automatically reflected in the corresponding target remote delta link object on the consumer portal. Any modifications or customizations made to the remote delta link object at the consumer portal override those of the producer's source object. In this manner, changes made to the second object are reflected in the first object while preserving the changes/modifications made to the first object on the first portal.

In one embodiment, a target object created on a consumer portal inherits attributes from a corresponding source object on the producer portal. As a result of the inheritance, changes to the source object on the producer portal are automatically updated in the corresponding target object on the consumer portal, except for when an attribute of the target object has been modified directly on the consumer portal. Changing an attribute of a target object on the consumer portal breaks the inheritance for that particular attribute. In this manner, an attribute modified on the consumer portal due to customization and/or modification on the consumer portal is preserved.

According to an embodiment of the present invention, techniques are provided for sharing content between portals. A first object is created on a first portal, the first object corresponding to a second object stored on a second portal remote from the first portal. An attribute of the first object may be modified on the first portal. The first object provides a link to the second object stored on the second portal such that a change to the second object on the second portal is reflected in the first object on the first portal except for a change made to the second object on the first portal.

The second object for which the first object is created may be selected from a set of objects stored by the second portal. The set of objects may be stored in a portal content directory of the second portal and the first object that is created may be stored in a portal content directory of the first portal. In one embodiment, the second object may be a portal snippet, a role, a workset, or a page.

In one embodiment, a request may be received at the first portal from a client for content corresponding to the first object. Integrated content may be provided to the client responsive to the request, wherein the integrated content reflects content corresponding to the second object on the second portal and one or more modifications to one or more attributes of the first object made at the first portal. The client may be a browser.

In one embodiment, responsive to a request received from a client, a state of the first object is determined at the first portal, the state including information related to the one or more modifications to the one or more attributes of the first object made at the first portal. The second portal receives the state of the first object. This may involve communicating the state of the first object from the first portal to the client and then communicating the state of the first object from the client to the second portal. At the second portal, the integrated content may be determined based upon the state of the first object and the second object on the second portal.

According to an embodiment of the present invention, the first object on the first portal is synchronized with changes to the second object on the second portal, wherein the synchronizing does not synchronize any attributes of the first object modified at the first portal. In this manner, changes made to the second object are reflected in the first object while preserving the changes/modifications made to the first object on the first portal.

According to an embodiment of the present invention, techniques are provided for displaying portal content. A request is received at a first portal from a client, the request requesting content for a web page provided by the first portal, the content for the web page including content corresponding to a first object stored on the first portal, the first object providing a link to a second object stored on a second portal remote from the first portal. Integrated content is then generated on the second portal, the integrated content reflecting content corresponding to the second object on the second portal and reflecting one or more modifications made to the first object on the first portal. The integrated content is provided to the client for display in the web page.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
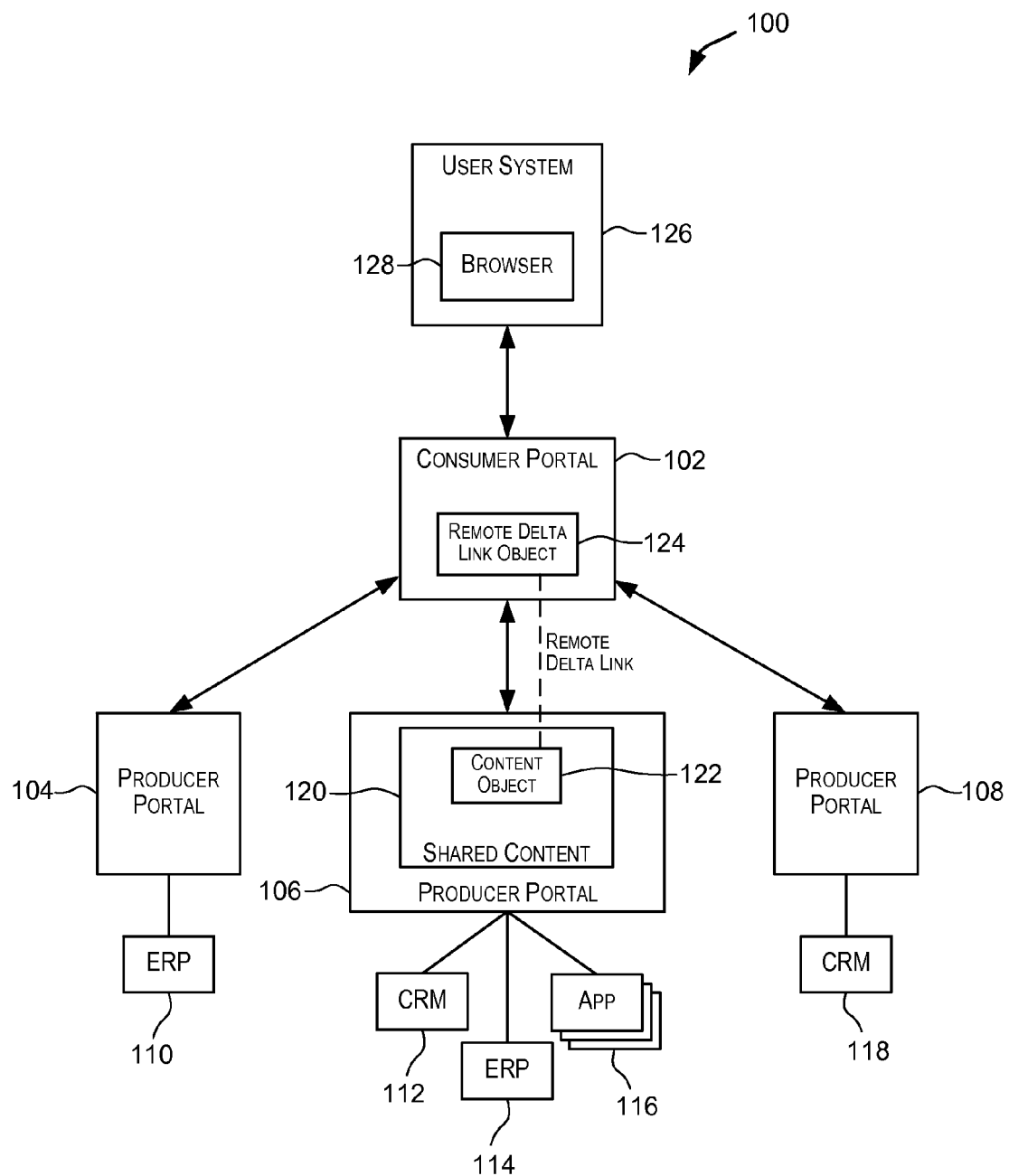
FIG. 1 is a simplified block diagram of a network of portals that may incorporate an embodiment of the present invention.

Embodiments of the present invention provide techniques for sharing content between portals. FIG. 1 is a simplified block diagram of a network 100 of portals that may incorporate an embodiment of the present invention. Network environment 100 depicted in FIG. 1 is merely illustrative of an embodiment incorporating the present invention and is not intended to limit the scope of the invention as recited in the claims. Embodiments of the present invention may be incorporated into various other systems and devices. One of ordinary skill in the art would recognize other variations, modifications, and alternatives.

As depicted in FIG. 1, network 100 comprises a number of portals 102, 104, 106, and 108. Network 100 may be a federated portal network (FPN) comprising distributed portal installations from one or more vendors that share content with one another. This gives users at each location a single portal access point, enabling them to gain seamless access to information, services and applications distributed on portals throughout the entire organizational network.

In network 100, a portal can play two roles as a producer and/or as a consumer. A producer portal is a portal that exposes its content for consumption by other portals in the network. A consumer portal is a portal that accesses and uses remote content provided by another producer portal in the network. A producer portal is thus the source of the remote content that is being shared and the consumer portal is the consumer of the shared content. A portal may act as a consumer and a producer at the same time.

The embodiment depicted in FIG. 1 comprises a consumer portal 102 and three producer portals 104, 106, and 108. Each producer portal may provide access to different types of data, services, and applications for consumption by consumer portal 102. For example, as depicted in FIG. 1, producer portal 104 provides access to ERP data and services 110, producer portal 106 provides access to Customer Relationship Management (CRM) data and services 112, ERP data and services 114 and various applications 116, and producer portal 108 provides access to CRM data and services 118.

In order to facilitate content sharing, a producer portal may identify content owned by the producer portal that is to be made available for sharing with other remote portals. For example, an administrator of producer portal 106 may identify content 120 on producer portal 106 to be shared with other remote portals. Content 120 is thus available for consumption by other portals. The shared content may include iViews (in general, portal snippets), pages, roles, worksets, etc. The content to be shared on producer portal 106 may be exposed by setting the appropriate portal permissions associated with the content. Shared content 120 may comprise a number of content objects including content object 122 depicted in FIG. 1. For each exposed content object, permissions may be set by an administrator of producer portal 106 that enable sharing and consumption of the content object by other remote portals. These permissions may include permissions that are applicable to all consumer portals in general and/or permissions that are applicable to specific consumer portals that have registered with the producer portal. The content made available for sharing may be stored in a Portal Content Directory or PCD of producer portal 106. The content can be viewed from the consumer's content catalog.

Consumer portal 102 may then access the content exposed by a producer portal for sharing such as content 120 exposed for sharing by producer portal 106. In one embodiment, an administrator of consumer portal 102 defines a connection to producer portal 106 and registers the consumer portal with the producer portal. Once content 120 on producer portal 106 to be shared has been defined, the administrator of consumer portal 102, with the requisite permissions, may access and browse the shared content to identify content to be consumed by the consumer portal. As previously indicated, in one embodiment, the shared content may be stored in the PCD and can be viewed/browsed for in the Portal Content Catalog of producer portal 106. An administrator of consumer portal 102 may browse the Portal Content Catalog of remote producer portal 106 and identify one or more of the exposed content objects to be copied to consumer portal 102. The administrator on consumer portal 102 may select relevant roles, worksets, pages, iViews, etc. residing on producer portal 106 or folders storing one or more content objects on producer portal 106 to be copied to consumer portal 102. The copied content objects are created locally on consumer portal 102 as remote delta link objects. Each remote delta link object on consumer portal 102 provides a link to the corresponding content object on producer portal 106. In this manner, an administrator on consumer portal 102 may create remote delta links on a consumer portal to content objects residing on a remote producer portal.

A remote delta link object created on the consumer portal for a content object residing on the producer portal is referred to as a "target object" corresponding to the content object on the producer portal. The content object on the producer portal for which a target remote delta link object is created on the consumer portal is referred to as a "source object" corresponding to the target object. For example, as depicted in FIG. 1, a target remote delta link object 124 is created on consumer portal 102 for a source remote content object 122 stored on producer portal 106. The consumer portal may clone the complete portal content structure (roles, worksets, pages, iViews, etc.) of the producer portal or portions thereof In one embodiment, the remote delta link objects are stored in the PCD of consumer portal 102.

Figure 2:
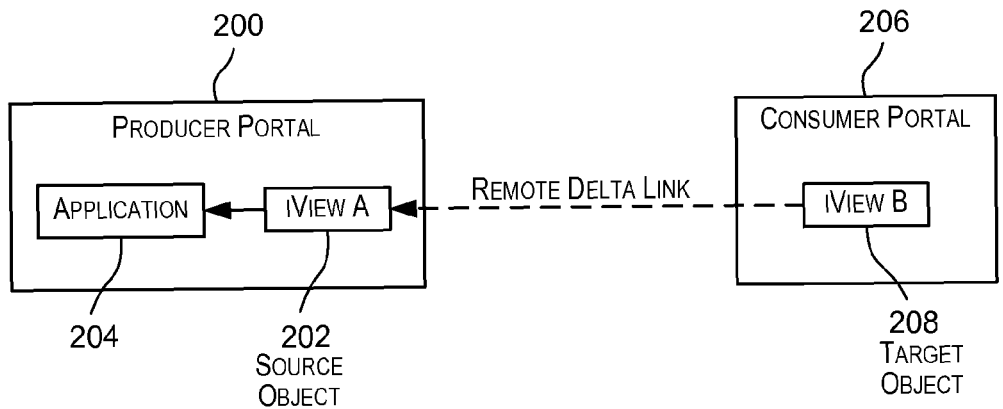
FIG. 2 depicts creation of a target object on a consumer portal that provides a remote delta link to a source object on a producer portal according to an embodiment of the present invention.

FIG. 2 depicts creation of a target object on a consumer portal that provides a remote delta link to a source object on a producer portal according to an embodiment of the present invention. As depicted in FIG. 2, a content object (iView A) 202 exists as a local entity on producer portal 200 and executes an application 204 residing on the same portal. At design time, an administrator on consumer portal 206 may create a target object 208 (iView B) on consumer portal 206 corresponding to source object 202 on producer portal 200. Target object 208 provides a remote delta link to source object 202 on producer portal 200 and is accordingly referred to as a remote delta link object.

Once one or more remote delta link objects have been created locally on the consumer portal, the remote delta link objects may be managed like any other local content on the consumer portal. For example, remote delta link object 124 may be managed as a local object on consumer portal 102. Remote delta link object 124 may be reused, configured, and customized as local content on consumer portal 102.

A remote delta link object on the consumer portal may be customized on the consumer portal to suit local needs. The customizations or modifications may be performed by an administrator of the consumer portal or by the end user. These customizations however do not affect the source object on the producer portal. Accordingly, changes made to remote delta link object 124 do not affect source content object 122. The customizations/modifications may include modifying one or more attributes of the target object. Modifying an attribute may include a property of a remote delta link object, hiding content (e.g., hiding existing content in a page object), switching layouts (e.g., switching layouts already assigned to a remote delta link content object (e.g., a page)), and the like.

The remote delta links mechanism provides for inheritance of attributes. A target object created on a consumer portal inherits attributes from a corresponding source object on the producer portal. As a result of the inheritance, changes to the source object on the producer portal are automatically updated in the corresponding target object on the consumer portal. Changes made to a target object on the consumer portal override those of the source object on the producer portal. Changing an attribute of a target object on the consumer portal breaks the inheritance for that particular attribute. In this manner, an attribute modified on the consumer portal due to customization and/or modification on the consumer portal is preserved. Accordingly, remote content may be modified on the consumer portal as a result of customization, but at the same time the unmodified content is synchronized with its source content on the producer portal.

Remote delta link objects stored on a consumer portal may be embedded into local content (e.g., pages, worksets, roles) offered by the consumer portal and assigned to local users of the consumer portal. In this manner, remote content stored on the producer portal may be offered to a user of the consumer portal along with local content stored on the consumer portal.

At runtime, a client (user) may request content from consumer portal 102. The content request may be initiated from a client program such as a browser 128 running on a user system 126 depicted in FIG. 1 or other program or application. For example, in the process of rendering a web page, browser 128 may request content for the web page from consumer portal 102. The content request is communicated from browser 128 to consumer portal 102. The requested content may include content that is local to consumer portal 102 and also remote content (due to a remote delta link object being embedded in the web page) stored by a remote producer portal such as producer portal 106. In response to the content request, processing is performed by consumer portal 102 and producer portal 106 such that the local content from consumer portal 102 and the remote content from the producer portal are both provided to browser 128 in a seamless integrated manner, thus providing a continuous experience for the end user.

The remote content for the remote delta link objects is executed on the producer portal. The application executing the remote content thus executes on the producer portal. Due to the inheritance, any changes to the remote content on the producer portal are reflected in the content provided to the user, unless the content has been customized on the consumer portal, in which case the customized content is provided to the user. In this manner, remote content sharing is enabled such that modifications to the content at the remote content source are reflected in the content provided to the browser while also allowing local content customizations. Further details describing a method for providing content to a client in response to content request are provided below.

Various activities may be performed on a producer portal and a consumer portal prior to runtime to facilitate sharing of content using the remote delta link technique. In one embodiment, these activities may be performed by administrators on the producer portal and the consumer portal. Some activities may need to be serialized, while others may be performed in parallel on the producer portal and the consumer portal. Various tools may be provided on the producer portal and the consumer portal for performing these activities.

The activities may include: (1) Configuring user repository settings on the producer portal and the consumer portal: In one embodiment, user repository settings on the producer portal and the consumer portal are set such that the user base used by the producer portal comprises information related to users of the consumer portal that will be accessing remote content stored on the producer portal. This is because in some embodiments the remote content is executed on the producer portal using the user's profile from the consumer portal. Accordingly, the producer portal is provided access to the user information so that the producer portal has knowledge of the user of the consumer portal and the user can be successfully authenticated and authorized during runtime.

There are various ways in which consumer portal user information may be provided to the producer portal and the consumer portal. In one embodiment, a single user base may be used that can be accessed both by the producer portal and the consumer portal. In another embodiment, distributed user stores may be used with exact or partial duplication of information on one or more consumer portals and producer portals. In one embodiment, the user logon identifier is identical across various user bases.

(2) Configure proxy settings for the producer portal and the consumer portal: Network proxy server settings may be configured to enable communication between the servers hosting the producer portal and the consumer portal.

(3) Establish trust between a producer portal and a consumer portal: In one embodiment, trust needs to be established between the producer portal and the consumer portal so that users on the consumer portal are recognized as authenticated users when they request content from the producer portal. Setting up trust involves coordination between the consumer portal and the producer portal. In one embodiment, certificates may be used to establish trust. A portal server certificate file (verify.der) for the consumer portal may be downloaded from the consumer portal to the producer portal. On the producer portal, the certificate file may be imported and used to define certain parameters to complete the trust configuration.

(4) Configure registration password on producer portal: For increased security, a producer portal may set a registration password that a consumer portal needs to enter upon registration with the producer portal.

(5) Define initial caching configuration on consumer portal: In one embodiment, a dedicated caching service is provided for consumer portals running in a federated portal scenario. Its purpose is to reduce network trafficking to the producer portal by storing semantic objects on the consumer portal-side for reuse. The settings for the caching service may be set on the consumer portal. Various properties for the cache may be set such as the maximum number of objects that can be stored in memory cache, when the memory cache is full, the first-in-first-out (FIFO) method applies, the maximum amount of time (in seconds) a cached object can remain in the cache until it is invalidated, etc.

The cache settings may also define the frequency at which the remote delta link content on the consumer portal is updated with modifications made to their source objects on a producer portal. This may be performed per a schedule (defined by the cache settings) or manually. In the remote delta link mode, objects are also cached on the producer portal to reduce the number of round-trips between the producer portal and the consumer portal. In one embodiment, the producer portal automatically sends content modifications in source objects to their corresponding target remote delta link objects on the consumer portal once every hour. This interval is configurable. An administrator on the consumer portal may initiate a request for a content update from its producer portals.

(6) Identify content to be shared on the producer portal by setting appropriate permissions: An administrator on the producer portal may set permissions associated with content objects on the producer portal so that a consumer portal can view and copy the producer portal shared content and users accessing a localized iView on the consumer portal can run the portal component located on the producer portal. An administrator on the consumer portal may also set permissions so that the shared content on the producer portal is available to administrators and end users on the consumer-side. In remote delta link mode, the portal application on the producer is executed at runtime. End-user permissions are assigned to the relevant users from the consumer portal to the iView on the producer portal. Different levels of permissions may be assigned.

(7) Consumer portal adds a producer portal: An administrator on the consumer portal may add one of more producer portals to the consumer portal. Each added producer portal may be represented by a producer object that represents a connection instance to the remote site of the producer portal.

(8) Check producer alias on consumer portal: In one embodiment, each producer object has a single, unique alias. The producer alias is used in various user interfaces in the consumer portal to identify the producer portal. When a consumer portal consumes content from a producer portal, the corresponding content objects generated on the consumer portal contain a reference to the source producer portal; this reference is the producer alias. This alias is generally automatically generated when a producer portal is added by a consumer portal.

(9) Test connection from consumer portal to producer portal: The connectivity between the consumer portal and the producer portal may be checked.

(10) Register a consumer portal: An administrator on a portal may register the portal as a consumer portal with a producer portal that has been added by the consumer portal (in (7)). Current registration status of the consumer portal may also be viewed. In one embodiment, a consumer portal has to register with the producer portal before being able to use content exposed by the producer portal. Some producers may also request that certain parameters be configured by the registering consumer portal as part of the registration process.

(11) Assign permissions on consumer portal: An administrator on the consumer portal may assign administrator permissions for producer objects so that other administrators on the consumer portal can perform various tasks related to the producer portal. The levels of permission may be different and determine which tasks an administrator can perform. Permissions assigned to shared content by the administrator on the producer portal also determine the tasks that administrators can perform on the consumer portal. The administrator on the consumer portal may also assign permissions to producer objects to end users to enable them to run content at runtime.

(12) Browse shared contents on the producer portal and identify content to be copied to the consumer portal: An administrator on the consumer portal may browse the Portal Content Catalog of a remote producer portal for shared content objects and select content for which remote delta links are to be created. Remote delta link objects corresponding to the selected content from the producer portal are then created on the consumer portal. The select content from the producer portal may be a content object such as a role, workset, page, iView, business objects, etc. or folders comprising one or more content objects or other folders.

(13) Customize copied objects on the consumer portal: Once remote delta link objects have been created on a consumer portal, the remote delta link objects may optionally be customized or modified by the administrator or the end user. Customization includes changing one or more attributes of a remote delta link object.

Various assignments may be made on the consumer portal such as assigning remote-based iViews and pages to local pages, assigning remote-based pages (and iViews) to local worksets and roles, assigning remote-based worksets to local roles, assigning remote-based roles to local users and groups, etc. The copied objects may be edited.

(14) Assign end-user permissions to a producer object and content on a consumer portal: End-user permission enables users to run content at runtime. Just as end users require end-user permission to run local content on the consumer portal, they also need end-user permission for content originating from a remote producer portal. Permissions may be assigned to an end-user to a producer portal and the remote-based local content on the consumer portal for the producer portal.

(15) User authentication techniques on the producer portal: Various different techniques may be used by a producer portal to authenticate users of the consumer portal logging into the producer portal. These techniques may include single sign-on techniques with logon tickets, with user ID and password, etc. A consumer portal may create a logon ticket and forward it to the client (user). The ticket may then be sent by the client's browser to the producer portal for authentication and logon.

A target object created on the consumer portal provides a link to the source object on the remote producer portal and inherits the properties of the corresponding source object. As a result, any change made to the source object is automatically reflected in the target object due to the inheritance. Delta link behavior thus applies to remote delta link content, whereby the source object resides on the producer portal and the target object resides on the consumer portal. A remote delta link behaves similarly to a local delta link in the perspective of attribute inheritance. If an attribute is modified in a source object on the producer portal, the modification is applied to the same attribute in the corresponding remote delta link target object on the consumer portal. In one embodiment, the producer portal automatically updates content modifications made to source objects with their corresponding target delta link objects on the consumer portal once every hour. The time interval is user configurable on the consumer portal.

A remote delta link object may be customized on the consumer portal. For example, an attribute of the remote delta link object may be modified on the consumer portal. When an attribute of a remote delta link target object is modified, the delta link inheritance of that attribute between the target object on the consumer portal and its source object on the producer portal is broken. Any subsequent modifications that are made to the same attribute in the source object on the producer portal are no longer updated in the target object on the consumer. This enables modifications made to a remote delta link object on the consumer portal to be preserved. The inheritance for a modified attribute on the target object may be restored so that updates to the attribute in the source object are reflected in the target object for that property.

In one embodiment, a tool such as a Property Editor may be provided for changing a property attribute of remote delta link objects on the consumer portal. The Property Editor may provide a user interface for displaying remote delta link objects and their properties. The Property Editor may display properties that have been modified with a special marking to enable a user to quickly identify them from properties that still inherit from the source objects. The Property Editor may also enable a user to reset or restore a property of a remote delta link object such that it inherits the property value from the corresponding source object on the producer portal.

In one embodiment, modification data comprising information related to changes made to a remote delta link object on the consumer portal by an administrator or end user of the consumer portal is stored on the producer portal. State information comprising information related to the state of a remote delta link object, including information related to modifications, if any, made to the remote delta link object, are communicated from the consumer portal to the producer portal and stored on the producer portal. This information is then used by the producer portal during runtime execution. This improves the runtime performance and reduces the amount of content data that has to be communicated from the consumer portal to the producer portal. In one embodiment, the modification data is kept as hidden content on producer portal. Once a baseline modification data is stored on the producer portal, subsequently, only deltas (changes from a previous state communicated from the consumer portal to the producer portal) are sent over from the consumer portal to the producer portal and then stored on the producer portal. This reduces the amount of data that is communicated between the consumer portal and the producer portal. The changes are synchronized at runtime if any modifications were done on the consumer since the last update done to the producer.

As indicated above, an administrator on the consumer portal may select a folder stored on a producer portal for copying via the remote delta link mechanism. The selected folder on the producer portal may comprise one or more content objects including one or more folders. In one embodiment, copying a folder involves special processing. In one embodiment, a remote delta link object on the consumer portal can have only one source object. In such an embodiment, if a folder is to be copied from the producer portal and the folder contains objects that have local delta links between them, the delta link is not regenerated between the corresponding remote delta link objects created on the consumer portal. Instead, each remote delta link object created on the consumer portal has a remote delta link that points to its corresponding source object on the producer portal. Once the remote delta link objects have been created on the consumer portal, they may be managed as local objects.

For example, in one scenario, a unit iView (iViewA) may be embedded as a local delta link to another iView (iViewB) in Page 1 stored on a producer portal. Both iViewA and Page 1 may be located in the same Portal Content Directory (PCD) folder on the producer portal. An administrator on a consumer portal may select the folder for copying to the consumer portal using the remote delta links mechanism. As a result of the copy, matching remote delta link objects are created on the consumer portal: iViewC corresponding to iViewA, iViewD corresponding to iViewB, and Page 2 corresponding to Page 1 on the producer portal. There is no delta link between iViewC and iViewD on the consumer portal (even though there is a delta link between iViewA and iViewB on the producer portal). Instead, remote delta links between objects on the producer portal and objects on the consumer portal are generated.

Subsequently, if an administrator on the producer portal modifies iViewA, then iViewB on the producer portal and iViewC on the consumer portal are automatically updated as a direct result. The iViewD is also updated as a result of iView B being updated. If the administrator on the producer portal modifies iViewB, then only iViewD on the consumer portal is updated. The iViewC on the consumer portal does not receive this update. If the administrator on the consumer portal modifies iView C, then none of the remaining iViews are updated since iViewD was never a delta link of iViewC. If the administrator on the consumer portal modifies iViewD, then none of the remaining iViews are updated. If the administrator on the producer portal adds or removes an iView in Page 1, the changes are updated in Page 2 on the consumer portal.

Figure 3:
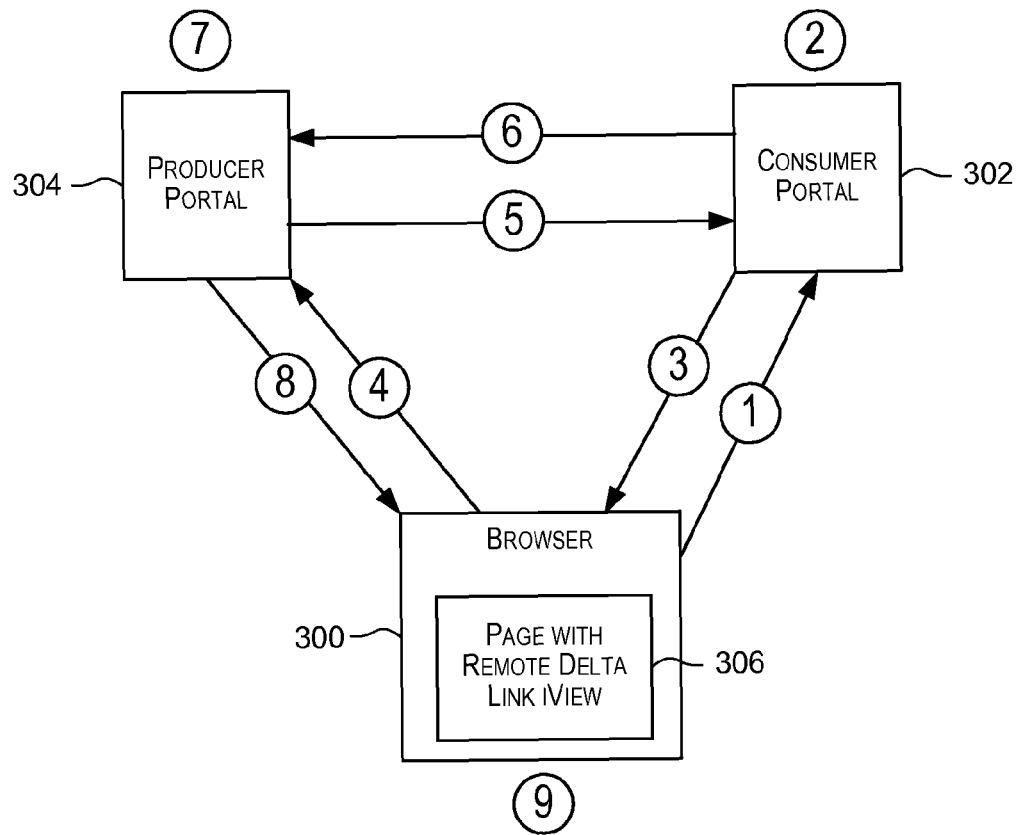
FIG. 3 depicts a simplified high-level runtime flow for content retrieval and rendering activities according to an embodiment of the present invention.

FIG. 3 depicts a simplified high-level runtime flow for content retrieval and rendering activities according to an embodiment of the present invention. The processing depicted in FIG. 3 may be performed by software modules (program of code, instructions) executed by a processor, hardware modules, or combinations thereof. The software modules may be stored on a computer-readable medium. The runtime flow depicted in FIG. 3 is merely illustrative of an embodiment of the present invention and is not intended to limit the scope of the present invention. Other variations, modifications, and alternatives are also within the scope of the present invention.

As depicted in FIG. 3, the players involved in the processing include a browser 300 (or any other client program used for requesting content from a portal) running on a user system and displaying content from a consumer portal 302, a consumer portal 302, and a producer portal 304. The content displayed by browser 300 may be a page 306 locally provided by consumer portal 302 and containing an embedded remote delta link iView from producer portal 304. In order to render the page, the remote content has to be fetched from producer portal 304.

Processing may be initiated when a user opens a browser 300 on a user system and enters the URL of consumer portal 302 and requests some content and framework from consumer portal 302 (step 1). As part of step 1, browser 300 may open a web page and request content to be rendered in the web page from consumer portal 302. The web page may comprise local content offered by consumer portal 302 and one or more remote delta link objects corresponding to remote content stored on producer portal 304. Accordingly, the processing in FIG. 3 depicts a method of displaying the web page. Some of the content requested by browser 300 may be available on consumer portal 302, while other content may correspond to remote delta links and thus come from remote producer portal 304.

Upon receiving the content request, consumer portal 302 builds navigation and local content. (step 2). As part of step (2), consumer portal 302 may also determine the state of remote delta link objects on consumer portal 302, including information related to any modifications to the remote delta link objects made at consumer portal 302. In one embodiment, the state information for a remote delta link object may include information related to all the attributes of the remote delta link object. In another embodiment, consumer portal 302 may determine only changes to the attributes of a remote delta link object since a previous state exchange with producer portal 304 and the state information may comprise only these changes. This reduces the amount of information included in the state information that is communicated from consumer portal 302 to browser 300. A flag may be associated with a remote delta link object to indicate if any modifications were done to the remote delta link object. For example, the flag may be set when an attribute is modified on the consumer portal since the last communication of the state information for the remote delta link object to the producer portal. In one embodiment, a digest or index is created encapsulating the state information.

The navigation, the content from consumer portal 302, a URL redirect to the remote content, and the state information are communicated to browser 300 from consumer portal 302 (step 3). Browser 300 then requests the remote content from producer portal 304 using the URL redirect received from consumer portal 302 in step (3) (step 4). The state information received from consumer portal 302 is transferred to producer portal 304 as part of step (4). As a result, after step (4), producer portal 304 knows the state of the content of remote delta links objects on consumer portal 302 and whether the state has changed from a prior state known to producer portal 304.

Because the remote content might have been modified (e.g., attributes of one or more remote delta link objects corresponding to the requested remote content may have been changed on the consumer portal) on consumer portal 302, producer portal 304 requests the changed properties from consumer portal 302 (step 5). This generally is done only once and subsequently producer portal 304 can determine the changes from the state information received in step (4). In response to the request from producer portal 304 in step (5), consumer portal 302 sends the remote delta link object attributes information to producer portal 304 (step 6). In one embodiment, consumer portal 302 determines those attributes of the remote delta link objects that have changed since a previous exchange with producer portal 304 and sends only the changed attributes (i.e., the delta change from a previous exchange) to producer portal 304. This optimizes the amount of information that is communicated to producer portal 304.

On producer portal 304, the attributes of the remote delta link objects from the consumer portal and producer portal are integrated/merged for the remote delta link objects (step 7). In this manner, in step (7), producer portal 304 aggregates the latest local content from the source objects on producer portal 304 corresponding to the remote delta link objects with the customizations, if any, done on consumer portal 302 on the remote delta link target objects. The result of the aggregation is a fully resolved content (or integrated content) that reflects the content from producer portal 304 along with customizations, if any, made on consumer portal 302. As part of step 7, producer portal 304 compares the attributes of the remote delta link objects on consumer portal 302 and corresponding source objects on producer portal 304.

The fully resolved content (or integrated content) resulting from step (7) is then sent back to browser 300 from producer portal 304 (step 8). The content received from producer portal 304 is integrated with the local content received by browser 300 from consumer portal 302 in step (3) and rendered in the web page (step 9).

In the manner described above, a continuous experience is provided for the end user with the local content on consumer portal 302 being integrated with remote content from producer portal 304 while preserving the changes or customizations performed to the remote content on consumer portal 302. Embodiments of the present invention thus support mixed scenarios of local and remote content running together on the consumer portal. Remote-based content from different producer portals may be mixed in a local page or role on a consumer portal. Further, the remote content is executed on the producer portal. For example, remote delta link pages are executed at runtime on the producer portal.

As described above, a remote delta link object on a consumer portal provides a remote link to source object on a producer portal. The remote link behaves similarly to a local delta link in the perspective of attribute inheritance. The remote delta link objects on the consumer portal are thus kept synchronized with the changes made to the corresponding source objects on the producer portal. The link inherits the attributes of the source object unless it is overridden by a change to the remote delta link object on the consumer portal. The application executing the remote content resides and executes on the producer portal. During runtime, the modifications, if any, done to a remote delta link object on the consumer portal are fetched by the framework and provided to the producer portal such that the producer portal can integrate the modifications with the remote content and provide the resolved content to a client such as a browser.

Standard transport services (e.g., standard export and import services provided by portals) may be used to move content between a producer portal and a consumer portal, while keeping remote delta links intact between the producer portal and the consumer portal following the transport. This allows flexible transport of portal content between the producer portal and the consumer portal.

In one embodiment, when remote delta link objects are to be created for a set of source objects stored on the producer portal, the source objects that are referenced by the remote delta link objects are marshaled during design-time into version-independent objects that are then transported from the producer portal to the consumer portal. On the consumer portal side, the objects are un-marshaled and stored in a hidden space on the consumer portal. For example, the un-marshaled objects may be stored in a hidden space of the consumer portal PCD. Remote delta link objects are then created in the PCD (in the regular space) with local delta links to the un-marshaled objects stored in the hidden space. The remote delta link objects may then be customized on the consumer portal. During runtime, the state of a remote delta link object is communicated to the producer portal. The state information may include information for all the attributes of the remote delta link object or only information related to attributes that have changed since a previous state communication to the producer portal. The state information for the remote delta link objects is stored on the producer portal and used for generating integrated content in response to a content request. The integrated content that is generated is such that it reflects the source object content and any modifications made to the corresponding remote delta link object on the consumer portal.

Embodiments of the present invention thus provide version-free support. Because objects passed over the network are generated as protocol objects—a protocol which is maintained compatible between versions—portals at different versions may share content using the remote delta link mechanism. Producer portals and consumer portals may be at different versions.

Figure 4:
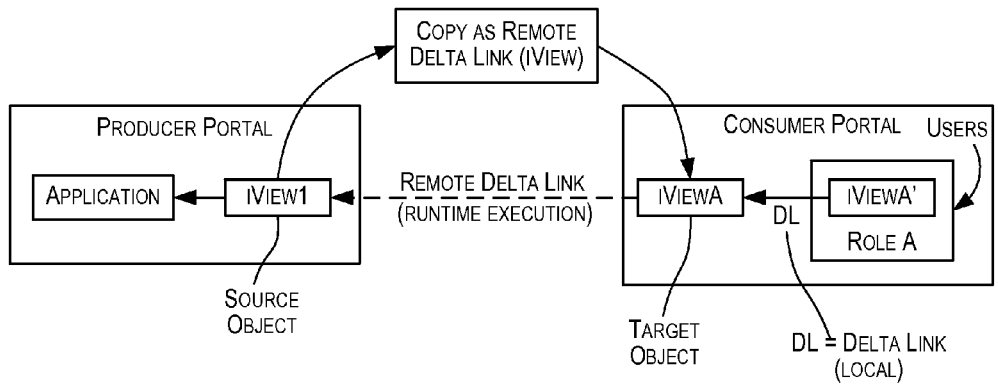
FIGS. 4, 5, and 6 depict examples of design time and runtime relationships between objects on a producer portal and a consumer portal according to an embodiment of the present invention.
Figure 5:
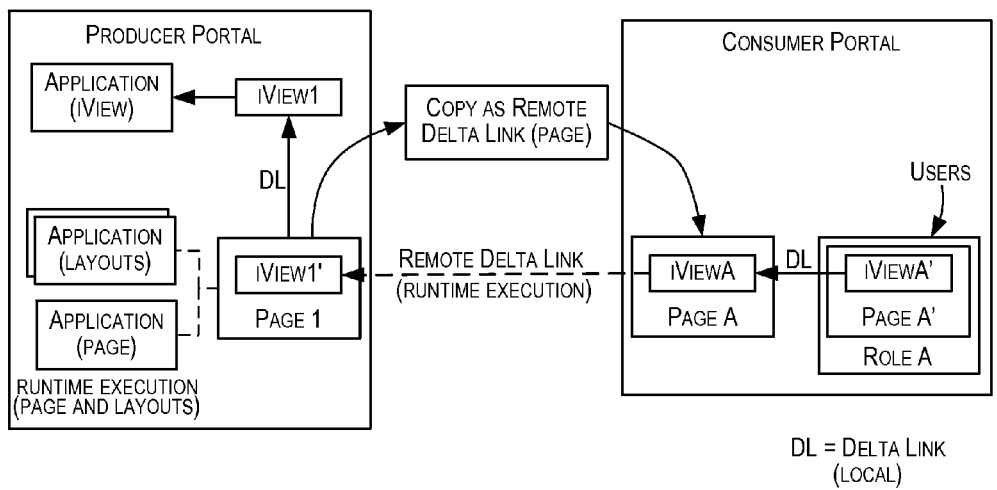
Figure 6:
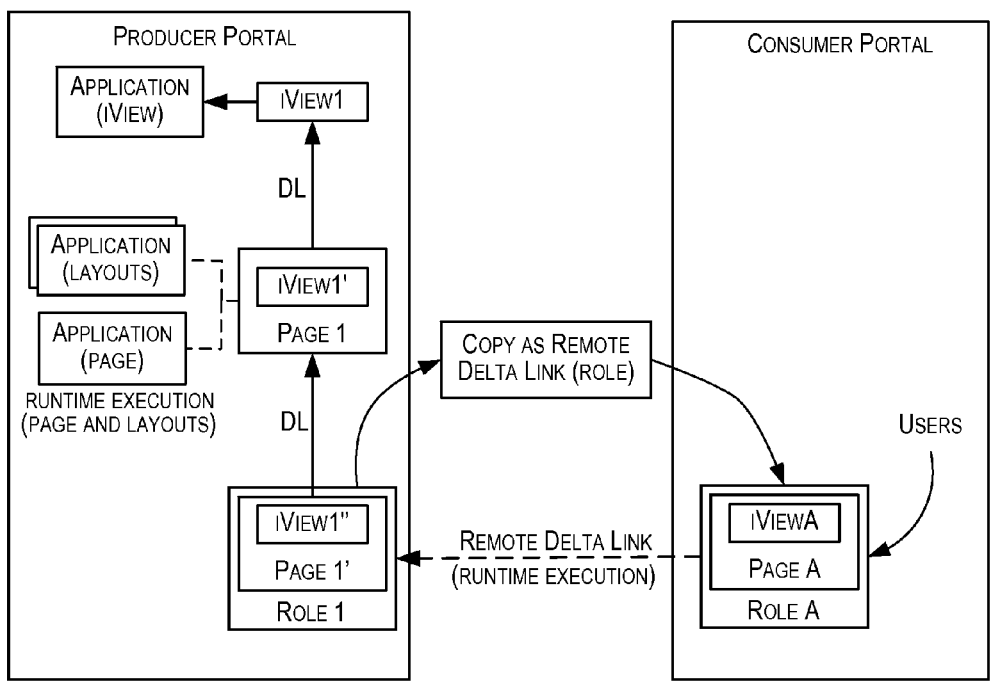

FIGS. 4, 5, and 6 depict examples of design time and runtime relationships between objects on a producer portal and a consumer portal according to an embodiment of the present invention. In FIG. 4, a remote delta link is created of an iView residing on a producer portal. As depicted in FIG. 4, a content iView object iView1 exists as a local entity on a producer portal and executes an application residing on the same producer portal. At design time, an administrator on a consumer portal may create a remote delta link object iViewA based upon content object iView1. The administrator on the consumer portal may then assign iViewA' as a delta link to a local role "Role A" on the consumer portal. At runtime, when users assigned to Role A log on to the consumer portal, the execution of iViewA' in Role A passes through iViewA, which executes iView1 on the producer portal.

In FIG. 5, a remote delta link is created of a single page object. As depicted in FIG. 5, a content object iView1 exists as a local entity on a producer portal and executes an application residing on the same producer portal. A content object Page 1 on the producer portal contains iView1', which is a delta link of iView1. At design time, an administrator on a consumer portal may create a remote delta link page object (Page A) on the consumer portal based on Page 1 on the producer portal. The administrator on the consumer portal may assign Page A to a local role (Role A). When users assigned to Role A log on to the consumer portal at runtime, the execution of iView A' in Role A passes through Page A (and iView A), which in turn executes Page 1, iView1', and iView1 on the producer portal. The execution of portal components for Page A and its layouts take place on the producer portal.

In FIG. 6, a remote delta link is created for a single role. As depicted in FIG. 6, a content object iView1 exists as a local entity on a producer portal and executes an application residing on the same producer portal. Page 1 on the producer portal contains iView1', which is a delta link of iView1. On the producer portal, Page 1 is assigned as a delta link to Role 1. At design time, an administrator on a consumer portal may create a remote delta link object (Role A) based on Role 1. The administrator on the consumer portal may then assign users to Role A. When the assigned users log on to the consumer portal, the execution of the role and its content takes place on the producer portal at runtime.

According to an embodiment of the present invention, remote delta link objects and their links to source objects are automatically set up when a package (e.g., an ERP package) is deployed to a consumer portal. When a package is deployed, processing for copying source objects from a producer portal to a consumer portal as remote delta link objects is performed automatically. Once a business package is deployed on the producer and a landscape configured correctly, deployment of the content on the consumer triggers automatic delta link creation. In one embodiment, the business package's contents are marked to symbolize it as a potential remote delta link and this triggers the automatic remote delta link creation when the package is deployed.

Figure 7:
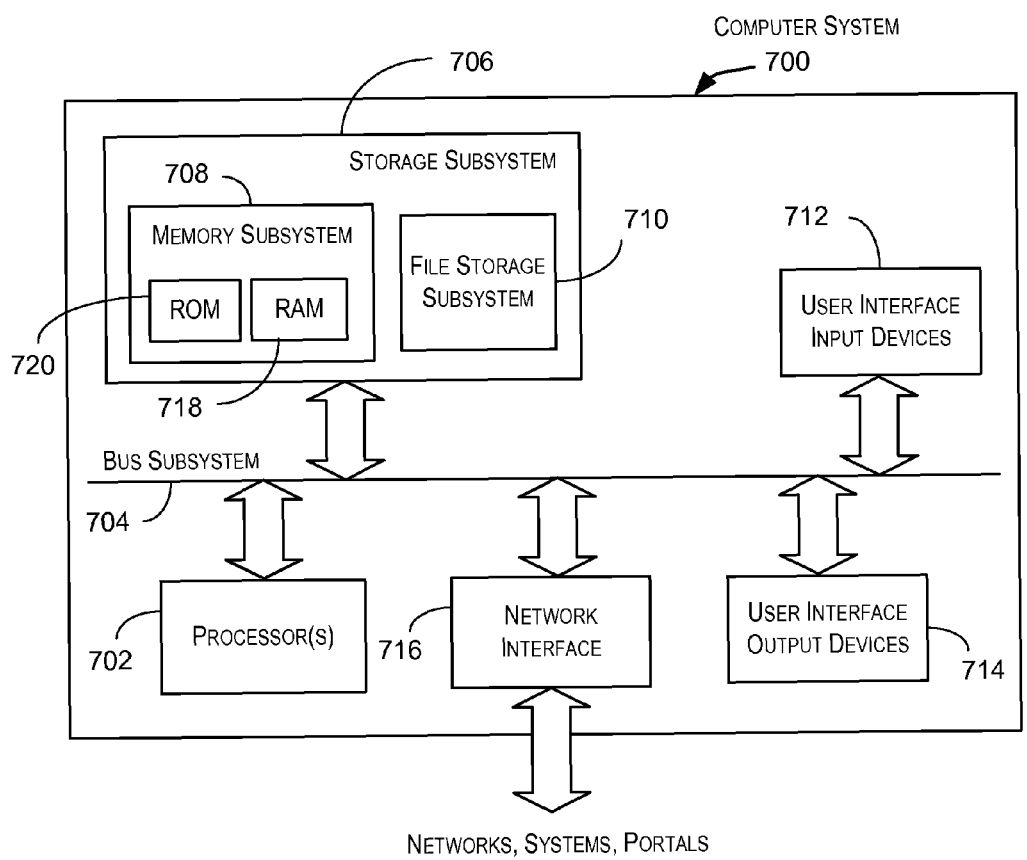
FIG. 7 is a simplified block diagram of a computer system that may be used to practice an embodiment of the present invention.

FIG. 7 is a simplified block diagram of a computer system 700 that may be used to practice an embodiment of the present invention. Computer system 700 may serve as the platform for a producer portal or a consumer portal. Computer system 700 may also be used as a user system. As shown in FIG. 7, computer system 700 includes a processor 702 that communicates with a number of peripheral subsystems via a bus subsystem 704. These peripheral subsystems may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, networks, and portals. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 may be configured to store the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 700 can be of various types including a personal computer, a portable computer, a workstation, a network computer, a mainframe, a kiosk, a server or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

The remote delta link technique, as described above, may be used in a distributed portals environment to share content between portals. For example, the distributed environment may comprise multiple portals such as a portal for running BI Java, a corporate portal, different ERP portals (to separate content and functionality), separate portals for running business-critical applications and non-business content, portals for different business units and departments, portals for company employees, and the like. Embodiments of the present invention provide a powerful and efficient way for sharing content between different portals.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method of sharing content between portals, the method comprising:
   creating a first object on a first portal, the first object corresponding to a second object stored on a second portal remote from the first portal;
   determining that an attribute A of the first object was modified on the first portal by a user to create attribute A1;
   determining that an attribute B of the first object was not modified on the first portal by the user;
   determining that attributes A and B of the second object have both changed at the second portal to create attributes A2 and B2;
   receiving, at the first portal, a request from a client for content corresponding to the first object;
   responsive to the request, determining a state of the first object at the first portal, the state including information related to the one or more modifications to the one or more attributes of the first object made at the first portal;
   communicating the state of the first object from the first portal to the client;
   communicating the state of the first object from the client to the second portal;
   receiving, at the second portal, the state of the first object from the client;
   responsive to the state of the first object, transmitting, from the second portal to the first portal, a request for attribute A1;
   receiving, at the second portal from the first portal, the attribute A1;
   determining, at the second portal, integrated content based upon the state of the first object and the second object on the second portal; and
   providing the integrated content from the second portal to the client responsive to the request, wherein the integrated content reflects content corresponding to attributes A1 and B2.

2. The method of claim 1 wherein creating the first object comprises receiving information indicative of selection of the second object from a set of objects stored by the second portal.

3. The method of claim 2 wherein the set of objects is stored in a portal content directory of the second portal and the first object is stored in a portal content directory of the first portal.

4. The method of claim 1 wherein the client is a browser.

5. The method of claim 1 wherein the second object is at least one of a portal snippet, a role, a workset, and a page.

6. A non-transitory, computer-readable medium storing a plurality of instructions for controlling a data processor to facilitate sharing of content between portals, the instructions, when executed by a processor, cause the processor to perform a method comprising:
   creating a first object on a first portal, the first object corresponding to a second object stored on a second portal remote from the first portal;
   determining that an attribute A of the first object was modified on the first portal by a user to create attribute A1;
   determining that an attribute B of the first object was not modified on the first portal by the user;
   determining that attributes A and B of the second object have both changed at the second portal to create attributes A2 and B2;
   receiving, at the first portal, a request from a client for content corresponding to the first object;
   responsive to the request, determining a state of the first object at the first portal, the state including information related to the one or more modifications to the one or more attributes of the first object made at the first portal;
   communicating the state of the first object from the first portal to the client;
   communicating the state of the first object from the client to the second portal;
   receiving, at the second portal, the state of the first object from the client;
   responsive to the state of the first object, transmitting, from the second portal to the first portal, a request for attribute A1;
   receiving, at the second portal from the first portal, the attribute A1;
   determining, at the second portal, integrated content based upon the state of the first object and the second object on the second portal; and providing the integrated content from the second portal to the client responsive to the request, wherein the integrated content reflects content corresponding to attributes A1 and B2.

7. The non-transitory, computer-readable medium of claim 6 wherein the instructions that cause the data processor to create the first object further comprise instructions that cause the data processor to receive information indicative of selection of the second object from a set of objects stored by the second portal.

8. The non-transitory, computer-readable medium of claim 7 wherein the set of objects is stored in a portal content directory of the second portal and the first object is stored in a portal content directory of the first portal.

9. The non-transitory, computer-readable medium of claim 6 wherein the client is a browser.

10. The non-transitory, computer-readable medium of claim 6 wherein the second object is at least one of a portal snippet, a role, a workset, and a page.

* * * * *